G. J. STOLL.
MOTOR TRACTOR.
APPLICATION FILED MAR. 26, 1915.
1,212,710.
Patented Jan. 16, 1917.
3 SHEETS—SHEET 1.
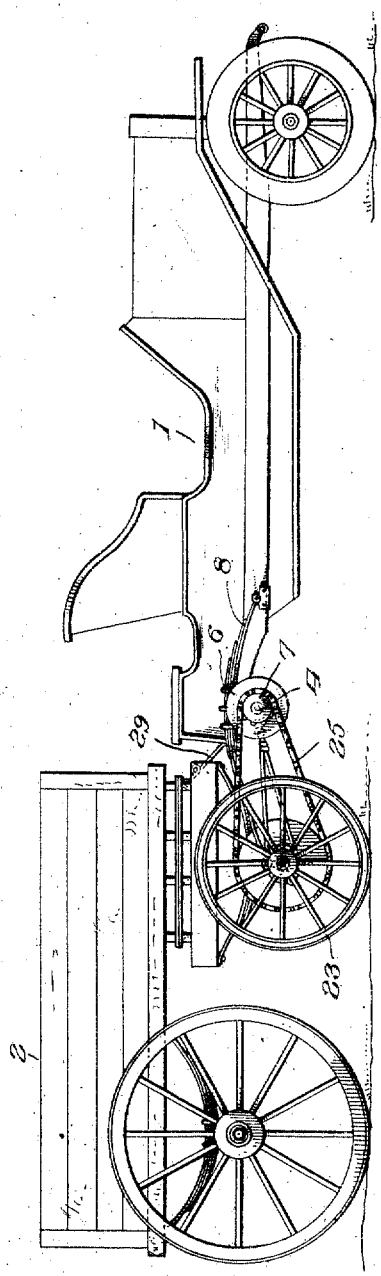
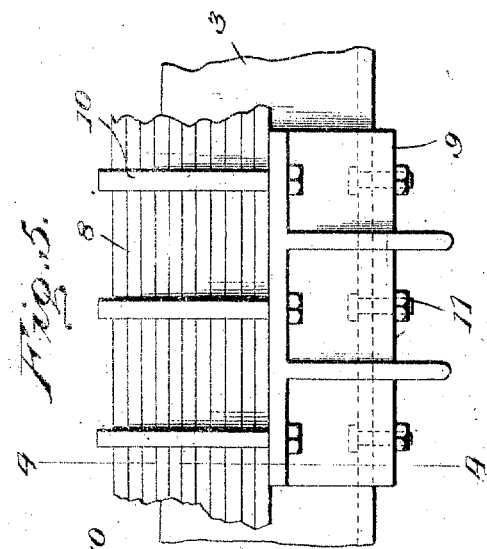
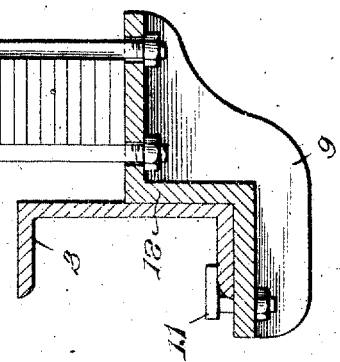
Inventor
G. J. Stoll.
By
Attorneys

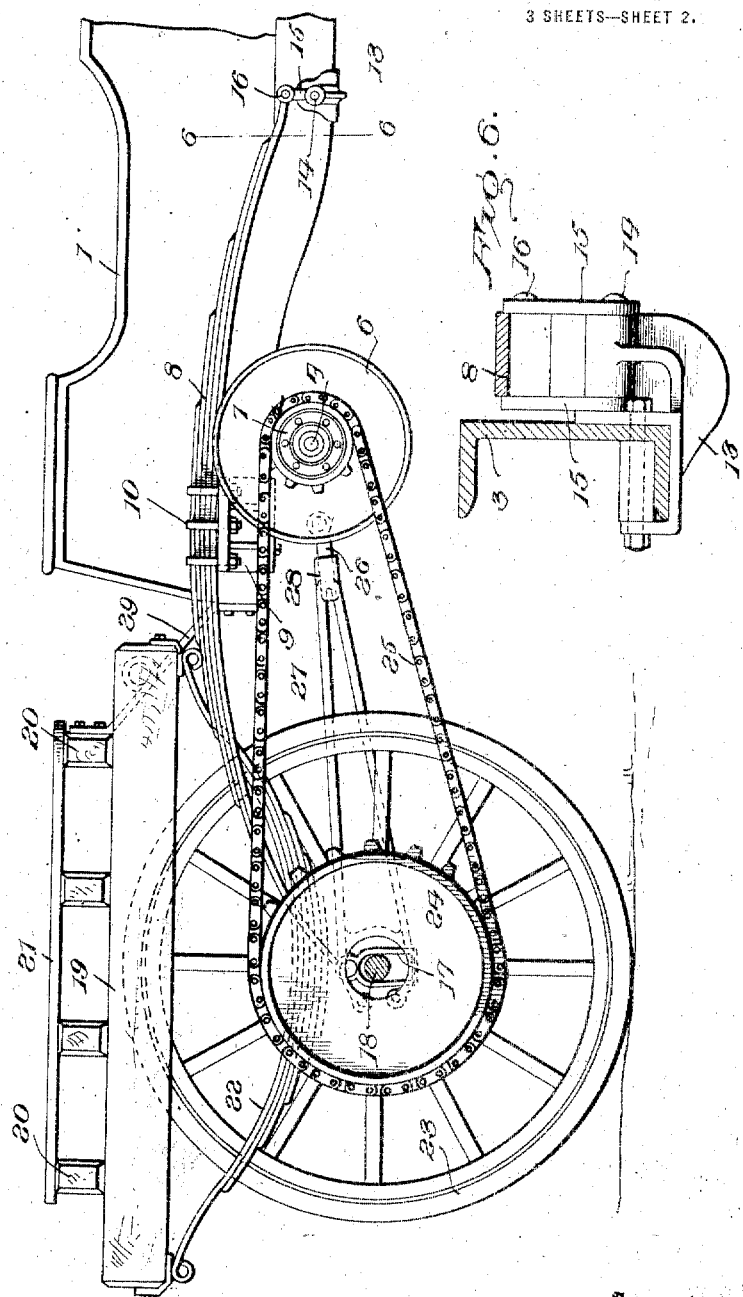

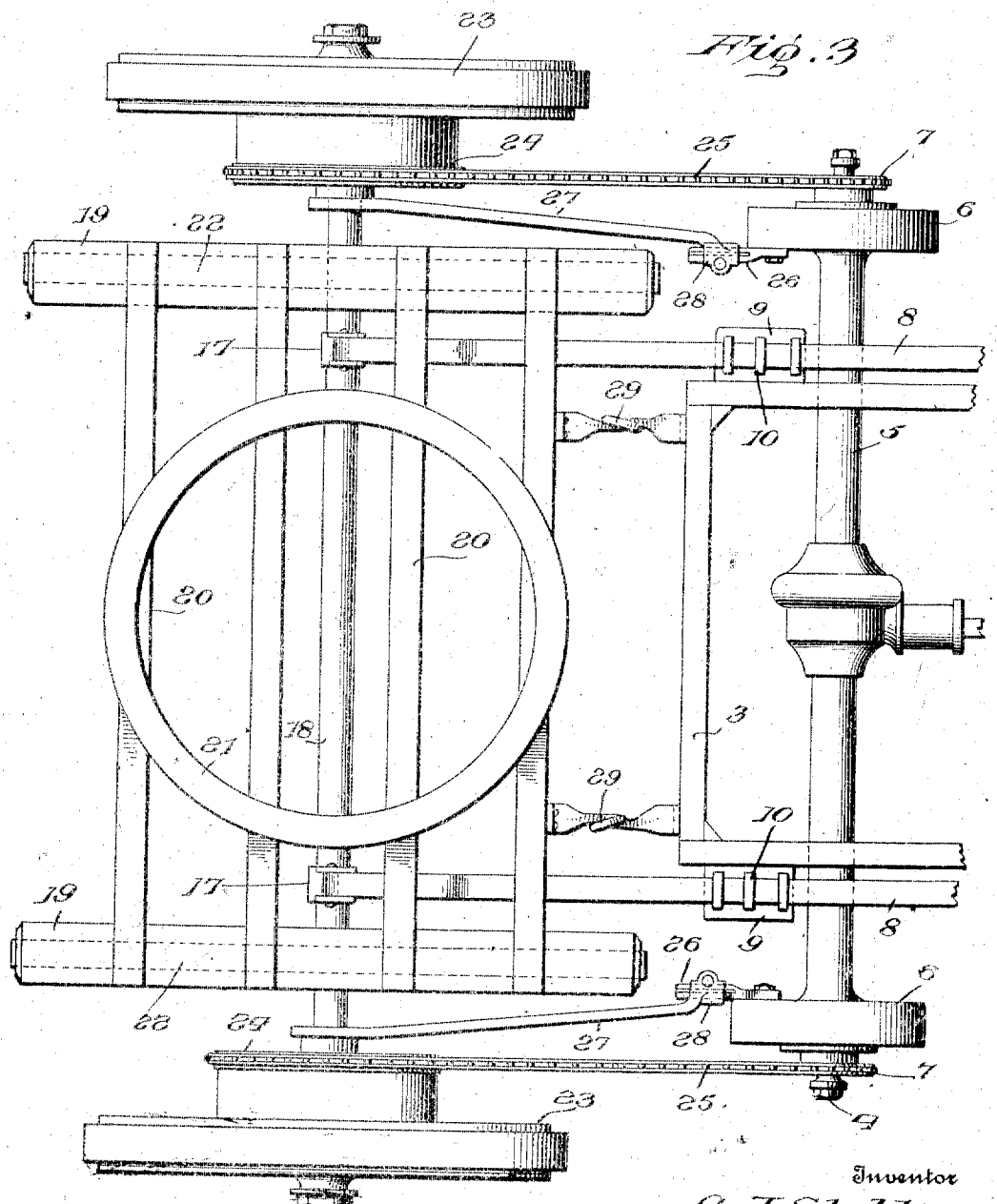

UNITED STATES PATENT OFFICE.

GEORGE J. STOLL, OF LOUISVILLE, KENTUCKY.

MOTOR-TRACTOR.

1,212,710.   Specification of Letters Patent.   Patented Jan. 16, 1917.

Application filed March 26, 1915. Serial No. 17,205.

*To all whom it may concern:*

Be it known that I, GEORGE J. STOLL, a citizen of the United States, residing at Louisville, in the county of Jefferson and State of Kentucky, have invented certain new and useful Improvements in Motor-Tractors, of which the following is a specification.

The invention is primarily designed to utilize a motor vehicle as a tractor for hauling vehicles of every description as well as propelling agricultural implements over the road or field.

The invention has for its object the conversion of a motor vehicle into a tractor and vice versa, whereby such vehicle may be utilized both as a tractor and carrier.

The invention contemplates an arrangement whereby the rear or drive wheels of a motor vehicle are adapted to be replaced by gear wheels, such gear wheels in turn being connected by suitable means with the wheels of a truck, vehicle, or like device so as to impart movement thereto for propelling the vehicle, implement, or like contrivance to be driven.

The invention further has for its object the provision of novel connecting means between the motor vehicle and the truck, or like part, whereby both are adapted to have an independent movement to allow for inequalities in the surface over which the tractor and truck are moving as well as to admit of proper steering.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations, and modifications within the scope of the invention as claimed may be resorted to when desired.

Referring to the drawings, Figure 1 is a view in elevation of a motor vehicle utilized as a tractor and a wagon coupled thereto and having its front wheels connected to the rear or drive axle of the motor vehicle. Fig. 2 is an enlarged sectional view of the rear portion of the motor vehicle and the truck coupled thereto. Fig. 3 is a top plan view of the parts illustrated in Fig. 2, the body of the motor vehicle being omitted to show more clearly the connecting means between the truck and frame of the tractor and between the wheels of the truck and the rear axle of the tractor. Fig. 4 is a transverse section on the line 4—4 of Fig. 5. Fig. 5 is an enlarged view showing the means for connecting the spring joining the truck and tractor to the frame of the motor vehicle. Fig. 6 is an enlarged section on the line 6—6 of Fig. 2 showing the means connecting the front end of the side spring to the frame of the motor vehicle.

Corresponding and like parts are referred to in the following description and indicated in all the views of the drawings by the same reference characters.

The numeral 1 designates a motor vehicle of any make or design and 2 a wagon or vehicle to be propelled. The motor vehicle may be driven by means of a motor of any type and comprises a frame 3, rear axle 4 and usual parts essential to the proper operation of a motor driven vehicle. The rear axle 4 is adapted to be connected to the body of the vehicle in any well known manner and is coupled to the motor, not shown, so as to receive motion therefrom. The axle 4 is mounted in a housing 5 which is provided at its outer ends with drums 6 for inclosing any well known type of brake mechanism. When the motor vehicle is converted into a tractor the usual rear wheels, not shown, are removed and are replaced by means of gear wheels 7 which may be of any diameter depending upon the power and speed required. The gear wheels 7 are secured to the outer ends of the axle 4 so as to rotate therewith and are adapted to be readily replaced by gear wheels of different size, thereby adapting the motor vehicle, when used as a tractor, for the nature of work required.

Longitudinal springs 8 are disposed at the sides of the motor vehicle and are connected thereto at their forward ends and intermediate of their ends. The springs 8 project in the rear of the motor vehicle and are adapted to have their rear ends coupled to the vehicle, truck, or other part to be drawn. Each of the springs 8 occupies a plurality of leaves and curves throughout its length being of semi-elliptic form. A bracket 9 is secured to the rear portion of each side bar of the frame 3 and this bracket projects laterally and forms a support for the spring 8, which is held to the horizontal and laterally extending portion of the bracket by means of a plurality of U-bolts 10. As shown most clearly in Fig. 4 the bracket 9 is offset between its inner and outer longitudinal edges, the inner portion overlapping the side bar of the frame 3 and being secured thereto by means of fastenings 11 and the intermediate portion extending along the outer side of the frame bar for a short distance, as indicated at 12, and the outer portion projecting horizontally and forming a seat for the spring 8.

The forward end of the spring is connected to a bracket 13, which is attached at one end to the side bar 3 and has its opposite end projecting laterally beyond the side bar and terminating in a sleeve through which a pin 14 is passed. Shackles 15 are connected at their lower ends to the bracket 13 by means of the pin 14 and a pin 16 connects the upper ends of the shackles to an eye formed at the front end of the spring 8. The bracket 13 is adapted to be secured to the side bar 3 in any manner. The rear end of each of the springs 8 is adapted to be attached to the truck or other part to be drawn in any convenient and substantial way. As indicated a clip 17 is attached to the axle 18 of the truck, vehicle, or like part and the spring 8 is attached to such clip in any preferred way.

The vehicle 2 is provided with a fore-truck which is connected thereto so as to turn about a vertical axis, such connection including the ordinary fifth wheel. The upper member of the fifth wheel is connected to the body or sub-structure of the vehicle, whereas the lower member of the fifth wheel is attached to the fore-truck. The truck comprises longitudinal bars 19 and cross bars 20. The lower member 21 of the fifth wheel is mounted upon the cross bars 20 and is secured thereto in any way. Side springs 22 connect opposite ends of the longitudinal bars 19 and such springs in turn are attached midway of their ends to the axle 18. The wheels 23 mounted upon the arms of the axle 18 are provided with gear wheels 24 which are connected to the gear wheels 7 by means of drive chains 25. It is to be understood that the gear wheels 24 may be of any diameter. The wheels 23 are adapted to be driven in substantially the same manner as the usual drive wheels of the motor vehicle, hence provision is had for making turns.

To preserve an approximate uniform distance between the centers of the axles 4 and 18 to insure proper transmission of the power by means of the drive chains 25 suitable connecting means are interposed between the tractor and the vehicle or fore-truck. Such connecting means is preferably adjustable whereby provision is had for coupling the tractor to different vehicles and also to allow for substitution of drive gears 7 and 24 of different diameters. As shown the means embody similar parts, which are disposed at the sides of the tractor and truck, each of such parts embodying members 26 and 27. The member 26 consists of a short bar which is fastened to the brake drum 6 and the member 27 comprises upper and lower elements provided at their forward ends with a clamp 28, which is adapted to be secured to the bar 26 in any desired adjusted position. The rear ends of the elements comprising the member 27 are curved toward each other and are secured in any manner to the axle 18. Brackets 29 connect the rear part of the frame 3 with the front part of the truck of the vehicle 2 or like part.

From the foregoing taken in connection with the accompanying drawings it will be understood that the invention provides for the utilization of a motor vehicle, both as a tractor and carrier, the parts associated therewith admitting of the ready conversion of the vehicle from one use to the other. The truck when coupled to the motor vehicle admits of the ready adaptation of the invention as a tractor to a vehicle of any type or to an agricultural implement for drawing the same over the road or field. The provision of the gear wheels and the adjustable connection between the frames of the motor vehicle and truck provide for the ready adaptation of the invention to loads of different mass, thereby preventing the overtaxing of the motor vehicle.

An essential feature of the invention is the provision whereby the gear wheels 7 may be quickly removed and replaced by others of different size so as to adapt the tractor to the load and required speed. It is further noted that the connection 29 between the fore-truck and the motor vehicle should be of a nature to allow for independent movement of the vehicle and truck, hence such connection is provided in its length with a coil. It is to be understood that a flexible connection of any kind may be substituted for the connection 29.

Having thus described the invention what is claimed as new is:—

In combination, a motor vehicle, a truck, bowed springs connected to the forward axle of the truck and extending along opposite sides of the motor vehicle, means at the intermediate portion of each spring detachably securing the same to the respective side of the rear end of the motor vehicle, means at the forward end of each spring detachably securing the same to the respective side of the motor vehicle in advance of the first-mentioned securing means, the said springs yieldably supporting the rear end of the said motor vehicle, and means yieldably resisting up and down movement of the rear end of the motor vehicle with relation to the truck comprising spaced resilient rods secured at their upper ends to the truck and inclined downwardly and forwardly and secured at their lower ends to the motor vehicle, the said rods being provided in their intermediate portions each with a coil.

In testimony whereof I affix my signature in presence of two witnesses.

GEORGE J. STOLL. [L. S.]

Witnesses:
 EUGENE A. CLEGG,
 ALBERT L. PRINZ.